(12) United States Patent
Abbo et al.

(10) Patent No.: US 10,841,988 B2
(45) Date of Patent: Nov. 17, 2020

(54) RETROFIT LED TUBE FOR REPLACING A FLUORESCENT TUBE

(71) Applicant: SIGNIFY HOLDING B.V., Eindhoven (NL)

(72) Inventors: Anteneh Alemu Abbo, Eindhoven (NL); Haimin Tao, Eindhoven (NL); Bernd Ackermann, Aachen (DE); Kumar Arulandu, Breda (NL); Wai Pang Chow, Eindhoven (NL); Pieter Johannes Stobbelaar, Eindhoven (NL); Ger Van Hees, Vosselaar (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/475,707

(22) PCT Filed: Dec. 14, 2017

(86) PCT No.: PCT/EP2017/082856
§ 371 (c)(1),
(2) Date: Jul. 3, 2019

(87) PCT Pub. No.: WO2018/127376
PCT Pub. Date: Jul. 12, 2018

(65) Prior Publication Data
US 2019/0346087 A1     Nov. 14, 2019

(30) Foreign Application Priority Data
Jan. 3, 2017   (EP) .................................... 17150168

(51) Int. Cl.
*H05B 41/28*     (2006.01)
*F21K 9/27*     (2016.01)
(Continued)

(52) U.S. Cl.
CPC ............... *H05B 41/28* (2013.01); *F21K 9/27* (2016.08); *F21Y 2115/10* (2016.08); *H05B 45/37* (2020.01)

(58) Field of Classification Search
CPC ....... F21K 9/27; F21Y 2115/10; H05B 33/08; H05B 41/28; H05B 45/37
See application file for complete search history.

(56) References Cited

U.S. PATENT DOCUMENTS 9,341,359 B1    5/2016  Fernandez et al.
10,136,482 B1 *  11/2018  Zhang .................... H05B 45/10
(Continued)

FOREIGN PATENT DOCUMENTS

| WO | 2012110973 A1 | 8/2012 |
| WO | 2015044311 A1 | 4/2015 |
| WO | 2016146372 A1 | 9/2016 |

*Primary Examiner* — Leah Simone Macchiarolo (57) ABSTRACT

A retrofit Light Emitting Diode, LED, tube for replacing a fluorescent tube, wherein said retrofit LED tube is arranged to be connected to a ballast, said retrofit LED tube comprising a ballast determining unit arranged for identifying a type of ballast connected to said retrofit LED tube by controlling an output voltage of said power rectifier to a first voltage and measuring a first current provided by said power rectifier, controlling said output voltage of said power rectifier to a second voltage and measuring a second current provided by said power rectifier, wherein said second voltage differs from said first voltage and determining said type of ballast based on said first and second output voltages and said measured first and second currents, wherein said ballast determining unit is further arranged to configure said configurable matching circuit based on said determined type of ballast.

15 Claims, 3 Drawing Sheets

(51) Int. Cl.
*F21Y 115/10* (2016.01)
*H05B 45/37* (2020.01)

(56) References Cited

U.S. PATENT DOCUMENTS

| | | |
|---|---|---|
| 2013/0320869 A1 | 12/2013 | Jans et al. |
| 2014/0111111 A1 | 4/2014 | Chitta et al. |
| 2014/0204571 A1 | 7/2014 | Zhang et al. |
| 2015/0198290 A1 | 7/2015 | Segers et al. |
| 2016/0073454 A1* | 3/2016 | Powell ................ H05B 45/395 |
| | | 315/201 |
| 2016/0165867 A1 | 6/2016 | Hyun |
| 2016/0234896 A1* | 8/2016 | Tomiyama ................ F21K 9/27 |
| 2016/0286621 A1* | 9/2016 | Tao ........................ F21K 9/235 |
| 2018/0187877 A1* | 7/2018 | Hsia ...................... H05B 45/50 |
| 2018/0301931 A1* | 10/2018 | Hsia ...................... H02M 3/158 |
| 2019/0021154 A1* | 1/2019 | Sadwick ............. F21V 23/0471 |
| 2019/0120441 A1* | 4/2019 | Wendt .................... F21V 23/06 |
| 2019/0297705 A1* | 9/2019 | Bovino ............. H05B 45/3578 |

\* cited by examiner

RETROFIT LED TUBE FOR REPLACING A FLUORESCENT TUBE

CROSS-REFERENCE TO PRIOR APPLICATIONS

This application is the U.S. National Phase application under 35 U.S.C. § 371 of International Application No. PCT/EP2017/082856, filed on Dec. 14, 2017, which claims the benefit of European Patent Application No. 17150168.7, filed on Jan. 3, 2017. These applications are hereby incorporated by reference herein.

FIELD OF THE INVENTION

The present invention generally relates to the field of lighting and, more specifically, to a retrofit Light Emitting Diode, LED, tube. The present invention further relates to a lighting system comprising a ballast and a retrofit LED tube, and relates to a method of operating a retrofit LED tube.

BACKGROUND OF THE INVENTION

Lighting devices have been developed that make use of Light Emitting Diodes, LEDs, for a variety of lighting applications. Owing to their long lifetime and high energy efficiency, LED tubes are nowadays also designed for replacing traditional fluorescent tubes, i.e. for retrofit applications. For such an application, a retrofit LED tube is typically adapted to fit into the socket of the respective tube fixture to be retrofitted. Moreover, since the maintenance of a tube is typically conducted by a user, the retrofit LED tube should ideally be readily operational with any type of suitable fixture without the need for re-wiring the fixture.

A specific type of a retrofit LED tube is, for example, disclosed in US 2015/0198290. Here, an LED tube arrangement is disclosed for replacing a fluorescent tube in a luminaire having a ballast for supplying power to the lamp. The LED tube arrangement comprises a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration.

Typically, ballasts are used in conventional fluorescent tubes to limit the current through the tube, which could otherwise rise to destructive levels due to the negative differential resistance artefact in the tube's voltage-current characteristic.

Different types of ballasts exist, each of which having their own output characteristic. One of the issues of the retrofit LED tubes is that these LED tubes should, preferably, be made compatible with all possible types of ballasts.

WO 2012/110973 discloses a lighting driver including a shunt switch circuit configured to detect when an input of the lighting driver is connected to mains power without a ballast, and in response thereto to disable the lighting driver, and further configured to detect a type of ballast connected to the input of the lighting driver when the input of the lighting driver is connected to the ballast, and to regulate a bus voltage of the shunt switch circuit according to the detected type of ballast; and a switching mode power supply configured to receive the bus voltage of the shunt switch circuit and in response thereto to supply a lamp current to drive one or more light emitting diodes.

SUMMARY OF THE INVENTION

It would be advantageous to achieve a retrofit Light Emitting Diode, LED, tube that is suitable for many types of ballasts that could be connected thereto, as well as a lighting system comprising such a retrofit LED tube. It would also be desirable to achieve a method of operating a retrofit LED tube such that the retrofit LED tube is suitable for a plurality of different types of ballasts.

To better address one or more of these concerns, in a first aspect of the disclosure, a retrofit Light Emitting Diode, LED, tube for replacing a fluorescent tube is presented. The retrofit LED tube is arranged to be connected to a ballast, wherein the retrofit LED tube comprising:
  an LED array for emitting light;
  a configurable matching circuit for controlling input power from a connected ballast, when connected, towards said LED array;
  an power rectifier having an input connected to said matching circuit and an output connected to said LED array, wherein said power rectifier is arranged to receive an AC supply voltage at its input, to convert said AC supply voltage to a DC voltage, and to provide said DC voltage, via its output, to said LED array;
  a ballast determining unit arranged for identifying a type of ballast connected to said retrofit LED tube by:
    controlling an output voltage of said power rectifier to a first voltage and measuring a first current provided by said power rectifier;
    controlling said output voltage of said power rectifier to a second voltage and measuring a second current provided by said power rectifier, wherein said second voltage differs from said first voltage;
    determining said type of ballast based on said first and second output voltages and said measured first and second currents;
  wherein said ballast determining unit is further arranged to configure said configurable matching circuit based on said determined type of ballast.

It was the insight of the inventors that ballast may have detectable current variation whenever said output voltage of the power rectifier changes. That is, the characteristic of output voltage of the power rectifier to the supplied current by the power rectifier is different for each type of ballast. This difference can be detected, i.e. measured, by the ballast determining unit, and, subsequently, the configurable matching circuit can be adequately configured based on the detection.

One of the aspects of the present disclosure is to better address the matching of the power input to the ballast to the power delivered to the retrofit LED tube. This improves the efficiency of the ballast and/or the retrofit LED tube.

In order to do so, the inventors have found that the matching circuit should be configured based on the type of ballast connected thereto. This could make sure that there is not a mismatch in the power by, for example, reflecting power from the matching circuit back to the ballast.

The above mentioned characteristic of the current and the voltage delivered by the power rectifier can be detected using at least two measurement points. In a first measurement point, a first output voltage of the power rectifier is set and the corresponding current provided by the power rectifier is measured. In a second measurement point, a second output voltage of the power rectifier is set and the corresponding current provided by the power rectifier is measured. Based on these two measurement points, an adequate estimate of the type of ballast connected to the retrofit LED tube can be made.

In such a case, no communication is required between the ballast and the retrofit LED tube. This means that the ballast does not need to actively communicate to the retrofit LED tube. The ballast does not need to provide details with respect to its characteristics. The retrofit LED tube is able to determine itself what type of ballast is connected, and is, subsequently, able to adjust the matching circuit accordingly.

It is noted that different types of ballast exist that may be connected to the retrofit LED tube, for example an electronic ballast, a High Frequency electronic ballast, a self-oscillating HF ballast, a magnetic ballast, a digital ballast and an Integrated Circuit, IC, controlled ballast.

Electronic ballasts may regulate the electric flow inside the lamp through electronic circuitry. The electronic ballast, sometimes also referred to as control gear, is typically arranged to limit the current which flows in an electric circuit such that the current is basically kept at a level that prevents the lamp from burning out. These type of ballasts may operate in parallel or in a series mode. Preferably, a series mode is used because in such case, the failure of a single lamp does not disrupt the working of all other lamps. Another type of ballast if the High Frequency ballast. Such a ballast typically uses a frequency above the 20 kHz.

Another type of ballast is a magnetic ballast which employ core and coil transformers to operate lamps. These type of ballasts are arranged to control electric current and the flow at an appropriate level for the lamps. Although these types of ballasts are the simplest, they are characterized by higher robustness.

The retrofit LED tube comprises a power rectifier in order for the LED tube to be used as a replacement tube for a conventional fluorescent tube. The power rectifier is arranged to receive an AC supply voltage at its input, to convert the AC supply voltage to a DC voltage, and to provide said DC voltage, at its output, to the LED array. Different type of rectifiers exist, each of which suitable to be used in the retrofit LED tube according to the present disclosure. For example, a half-wave rectification rectifier only allows the positive part of the AC supply voltage to pass while blocking the negative part of the AC supply voltage. This is typically accomplished using a single diode. In another example, a full wave rectification rectifier converts the whole of the AC supply voltage to one of constant polarity at its output. The positive part of the AC supply voltage is allowed to pass, and the negative part of the AC supply voltage is converted to a positive part. This may be accomplished using a bridge rectifier, or by using two diodes in combination with switches.

It is noted that, in accordance with the present disclosure, the ballast determining unit may be implemented in a hardware only approach, in a hardware and software approach, or in a software only approach. Using analogue and digital hardware components alone leads to a hardware only approach, which will be more elaborated with respect to the figures. A combined hardware and software approach is preferred as, often, a micro controller or the like is already present in the retrofit LED tube.

It is noted that, in accordance with the present disclosure, the configurable matching circuit may be implemented in a variety of manners. For example, capacitors, resistors and/or inductors may be switched in or out such that the impedance of the matching circuit can be adjusted. Another option, or in addition thereto, variable capacitors, resistors or inductors may be used wherein the variability of these components can be configured such that the impedance of the matching circuit can be matched to the type of ballast.

It is noted that, in accordance with the present disclosure, the ballast determining unit may sense the current in a variety of manners. For example, digital circuitry may be provided for actively sensing the current coming from the ballast. Another option is to use electrical resistors in the current path for achieving a voltage drop which represents the current from the ballast.

In an embodiment, the ballast determining unit is further arranged to bypass said configurable matching circuit during identification of said type of ballast.

The advantage of this embodiment is that the type of the ballast can be assessed more accurately. The matching network may disturb the output voltage of the power rectifier and may disturb the current provided by the power rectifier. By bypassing the matching circuit such a disturbance is no longer present. This means that the type of ballast connected to the retrofit LED tube can be determined more reliable.

In a further embodiment, the configurable matching circuit comprises two matching circuits:
  a first matching circuit matched to a self-oscillating ballast, and
  a second matching circuit matched to an Integrated Circuit, IC, controlled ballast,
wherein said ballast determining unit is arranged to select one of said two matching circuits based on said determined type of ballast.

The inventors have found that, typically, the ballasts can be categorized into two main groups. A first group is directed to a self-oscillating ballast and a second group is directed to an Integrated Circuit, IC, controlled ballast.

The basic concept behind this aspect is that self-oscillating ballasts have relatively more current variation for change in load voltage compared to IC-controlled ballasts.

In a further embodiment, said ballast determining unit comprises a predefined current threshold, wherein said ballast determining unit is arranged to:
  determine that said type of ballast is a self-oscillating ballast in case a difference in current between said first and second currents exceeds said predefined current threshold, and
  determine that said type of ballast is a IC controlled ballast in case a difference in current between said first and second currents falls below said predefined current threshold.

As mentioned above, the type of ballast connected to the retrofit LED tube can be derived from the voltage-current characteristic provided by the ballast, and thus also provided by the power rectifier. In order to determine the voltage-current characteristic, at least two measurement points are to be made. The voltage-current characteristic may be based on a linear dependency, an exponential dependency or a logarithmic dependency.

In case the difference in current between the first and second currents exceeds a predefined current threshold, it is assumed that the current is not completely static over the voltage range. This would imply that we are dealing with a self-oscillating ballast, as the self-oscillating ballast is less able to correct for these changes in output voltage/load.

In a further embodiment, the ballast determining unit is arranged to control said output voltage of said power rectifier by adapting a load at said output of said power rectifier.

The advantage hereof is that the load at the output of the power rectifier can easily be adjusted. For example, the load of the power rectifier can be short circuited such that the load is made instantly close to zero. This can be realized by providing a switch over the output of power rectifier for instantly short circuiting the output thereof.

In yet another embodiment, the ballast determining unit is arranged for identifying said type of ballast connected to said retrofit LED tube by:
  short circuiting said output of said power rectifier and measuring said first current provided by said power rectifier;
  enabling said LED array such that said LED array emits light and measuring said second current provided by said power rectifier;
  determining said type of ballast based on said first and second output voltages and said measured first and second currents.

The advantage of the above described embodiment is that it provides for a simple but effective way to generate two measurement points. A first measurement point is directed to the situation in which the output of the power rectifier is short circuited, i.e. the voltage output of the power rectifier is close to zero. A second measurement point is directed to the situation in which the LEDs are emitting light. The comparison of the currents delivered in both measurement points is an indication of the type of ballast connected to the retrofit LED tube.

In a further embodiment the ballast determining unit is further arranged for identifying said type of ballast connected to said retrofit LED tube by:
  controlling an output voltage of said power rectifier to a third voltage and measuring a third current provided by said power rectifier;
  determining said type of ballast based on said first and second and third output voltages and said measured first and second and third currents.

The accuracy of the determination of the type of ballast can further be increased in case a third measurement is performed. That is, a third measurement point is created to better estimate the difference in current provided at multiple voltage reference points. In such a case, a more accurate voltage-current characteristic can be assessed which leads to an improved detection of the type of ballast.

In a second aspect of the present disclosure there is provided a method of operating a retrofit LED tube according to any of the previous claims, wherein said method comprises the steps of:
  controlling, by said ballast determining unit, said output voltage of said power rectifier to said first voltage and measuring said first current provided by said power rectifier;
  controlling, by said ballast determining unit, said output voltage of said power rectifier to said second voltage and measuring said second current provided by said power rectifier, wherein said second voltage differs from said first voltage;
  determining, by said ballast determining unit, said type of ballast based on said first and second output voltages and said measured first and second currents;
  configuring, by said ballast determining unit, said configurable matching circuit based on said determined type of ballast.

It is noted that the advantages and definitions as disclosed with respect to the embodiments of the first aspect of the invention, being the retrofit LED tube, also correspond to the embodiments of the second aspect of the invention, being the method of operating such a retrofit LED tube, respectively.

The proposed method may be performed each time the retrofit LED tube is turned on, or may be performed once for a retrofit LED tube.

In an embodiment, the method comprises the initial step of:
  bypassing, by said ballast determining unit, said configurable matching circuit.

In a further embodiment, the step of configuring comprises:
  selecting, by said ballast determining unit, one of said two matching circuits based on said determined type of ballast.

In another embodiment, the step of determining comprises:
  determining, by said ballast determining unit, that said type of ballast is a self-oscillating ballast in case a difference in current between said first and second currents exceeds said predefined current threshold, and
  determining, by said ballast determining unit, that said type of ballast is a IC controlled ballast in case a difference in current between said first and second currents falls below said predefined current threshold.

In an embodiment, the steps of controlling comprise adapting a load at said output of said power rectifier.

In a further embodiment, said method comprises the steps of:
  short circuiting, by said ballast determining unit, said output of said power rectifier and measuring said first current provided by said power rectifier;
  enabling, by said ballast determining unit, said LED array such that said LED array emits light and measuring said second current provided by said power rectifier;
  determining, by said ballast determining unit, said type of ballast based on said first and second output voltages and said measured first and second currents.

In yet another embodiment, the method comprises the steps of:
  controlling, by said ballast determining unit, an output voltage of said power rectifier to a third voltage and measuring a third current provided by said power rectifier;
  determining, by said ballast determining unit, said type of ballast based on said first and second and third output voltages and said measured first and second and third currents.

In a third aspect, the invention provides for a computer program product, comprising a readable storage medium comprising instructions which, when executed on at least one processor, cause the at least one processor to carry out the method according to any of the embodiments as disclosed above.

It is noted that the advantages and definitions as disclosed with respect to the embodiments of the first and second aspect of the invention, being the retrofit LED tube and the method, respectively, also correspond to the embodiments of the thirds aspect of the invention, being the computer program product, respectively.

In a fourth aspect, the invention provides for a lighting system, comprising:
  a retrofit LED lamp tube according to any of the embodiments as disclosed above, and
  a ballast, wherein said ballast is connected to said retrofit LED tube.

The method may be effectively performed by a suitably programmed processor or programmable controller, such as a microprocessor or microcontroller provided with the solid-state light source.

These and other aspects of the invention will be apparent from and elucidated with reference to the embodiment(s) described hereinafter.

DETAILED DESCRIPTION

Figure 1:
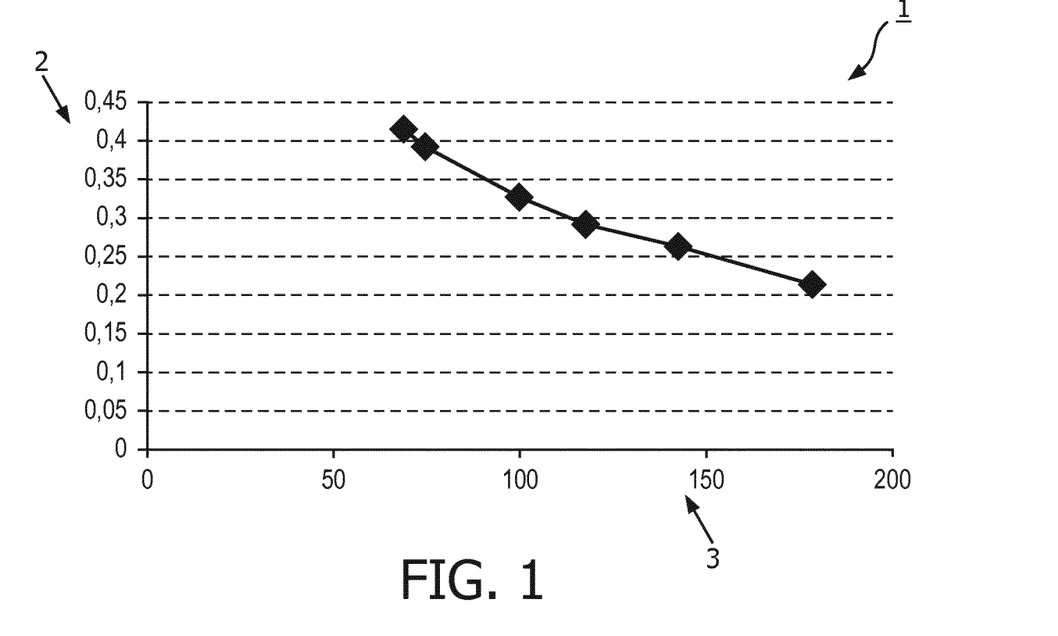
FIG. 1 shows a voltage current characteristic of a self-oscillating ballast.

FIG. 1 shows a voltage current characteristic 1 of a self-oscillating ballast. Here, the vertical axis 2 represents the current provided by the ballast to the retrofit LED tube in Amperes. The current depicted on the vertical axis is also a measure for current outputted by the power rectifier. In a practical embodiment, the current provided by the power rectifier is easier to determine/measure than the current provided by the ballast.

The horizontal axis 3 represents the voltage of the LED array. Here, it is clear that whenever the voltage increases, the current provided by the ballast decreases. This is a typical characteristic which is often observed for self-oscillating ballasts. The control loop of the self oscillating ballast is often not powerful or fast enough to swiftly correct for a change in the voltage.

Figure 2:
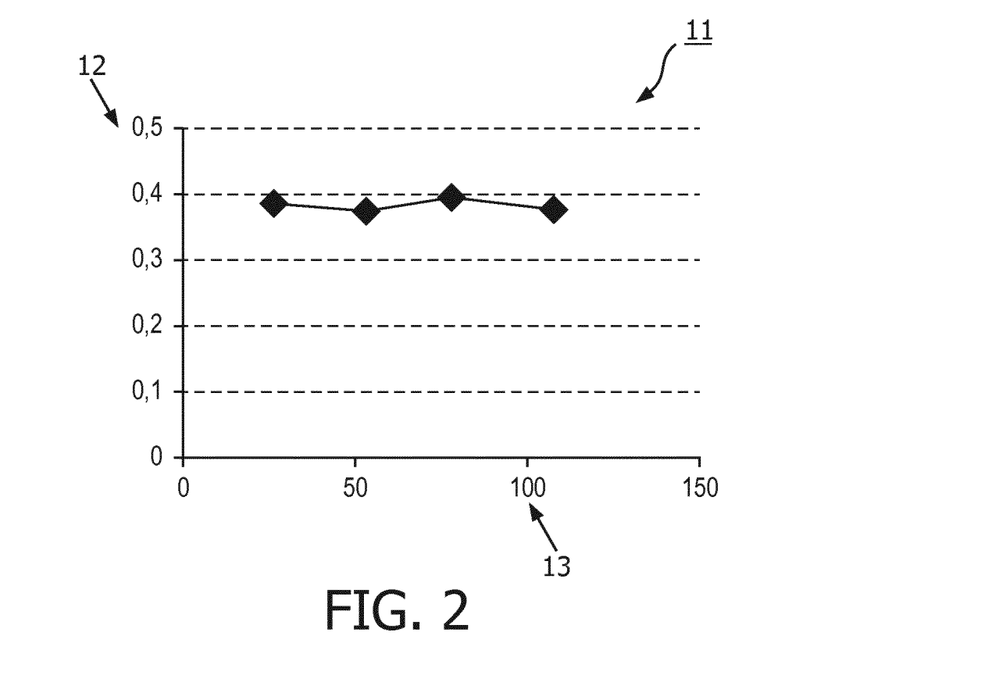
FIG. 2 shows a voltage current characteristic of an Integrated Circuit, IC, controlled ballast.

FIG. 2 shows a voltage current characteristic 11 of an Integrated Circuit, IC, controlled ballast. Here, the vertical axis 12 represents the current provided by the ballast to the retrofit LED tube in Amperes. The current depicted on the vertical axis is also a measure for current outputted by the power rectifier. In a practical embodiment, the current provided by the power rectifier is easier to determine/measure than the current provided by the ballast.

The horizontal axis 13 represents the voltage of the LED array. Here, it is clear that whenever the voltage increases, the current provided by the ballast is approximately the same. This is a typical characteristic which is often observed for IC controlled ballasts. The control loop of the IC controlled ballasts is often more powerful and/or faster compared to the control loop of the self-oscillating ballasts.

It is noted that the voltage current characteristics referenced to with reference numeral 1 and 11 are each composed of several measurement points. For example, the voltage current characteristic shown in FIG. 1 is composed of six measurement points, which six measurement points are indicated with diamonds. The lines between the diamonds are connecting lines such that the measurement points are connected to each other. Following the above, the connecting lines form interpolation points which could also be used in accordance with the present disclosure. This will be elaborated later on with respect to FIG. 3. The voltage current characteristic 11 of FIG. 2 shows four measurement points, each indicated with a specific diamond. Again, the connecting lines connecting these four diamonds form interpolation points which could also be used in accordance with the present disclosure which will be elaborated in more detail with respect to FIG. 3.

Figure 3:
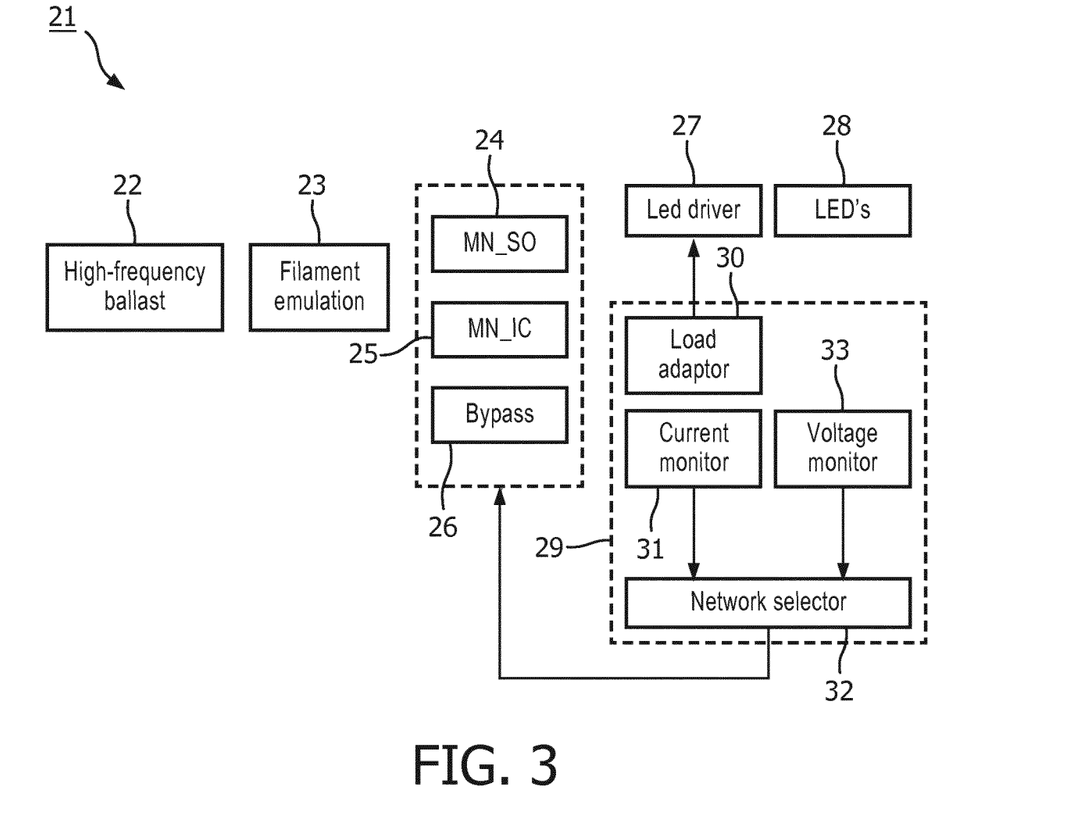
FIG. 3 shows a simplified block diagram of a lighting system according to the present disclosure.

FIG. 3 shows a simplified block diagram of a lighting system 21 according to the present disclosure.

The lighting system 21 comprises a high frequency ballast 22 and a retrofit LED tube. The retrofit LED tube comprises the building blocks as indicated with the reference numerals 23, 24, 25, 26, 27, 28, 29, 30, 31, 32 and 33. It is noted that, in accordance with the present disclosure, the high frequency ballast 22 may be of any type. Preferably, the high frequency ballast 22 is either a self-oscillating ballast or an IC controlled ballast.

The retrofit LED tube is arranged in a single housing. The housing is arranged to house each of the building blocks as indicated above. The housing may be a light transmissive housing or a partly light transmissive housing, configured as a retrofit tube type, for example.

The term retrofitted also defines some mechanical aspects of the LED tube. That is, a LED tube is retrofitted in case it fits in conventional armatures for fluorescent tubes, for example fluorescent tubes suitable for T5, T12 or anything alike. In order to fit in these conventional armatures, the retrofit LED tube comprises conducting pens for connecting, and supporting, the retrofit LED tube in the conventional armatures.

The retrofit LED tube is thus used for replacing a fluorescent tube. The retrofit LED tube should thus fit in the armature which is normally used for fluorescent tubes.

The retrofit LED tube comprises a LED array comprising a plurality of LED's 28 for emitting light, wherein the plurality of LED's may be divided into multiple parallel branches. Using multiple branches enables the possibility to drive each of LEDs in the branches differently. For example, the LEDs in the first branch can be driven such that they emit light at their maximum capacity, while the LEDs in the second branch are driven such that they do not emit any light at all.

Further, those skilled in the art will appreciate that in practical embodiments the LEDs are evenly distributed and spaced apart across the length of the tube, to provide for an evenly as possible lighting by the LED tube over its entire length. The present disclosure is not limited to any specific type of LED, nor to any colour LEDs. Typically, white coloured LEDs are used.

The retrofit LED tube further comprises a filament emulation circuit 23. The filament emulation circuit is typically used to avoid that the ballast goes into a protection mode. Such a fault detection mode of the ballast is active during the start-up of the retrofit LED tube, i.e. during a lamp recognition phase. After the lamp recognition phase, i.e. during the steady-state phase, the filament does typically not serve a useful purpose. The filament emulation circuit 23 is thus typically merely used for mimicking, to the ballast 22, that a fluorescent tube is connected.

Further, a configurable matching circuit 24, 25 is provided for controlling input power from the connected ballast 22 towards the LED array 28. A matching circuit is typically used such that the input impedance of an electric load significantly matches the output impedance of the ballast 22 such that power transfer between the ballast 22 to the retrofit LED tube is increased and/or such that signal reflection from the load is reduced.

In the present situation, the configurable matching circuit 24, 25 comprises two separate matching circuits. A first matching circuit is indicated with reference numeral 24 and is directed to match the output impedance of a self-oscillating ballast. The second matching circuit is indicated with reference numeral 25 and is directed to match the output impedance of an IC controlled ballast.

It is noted that the configurable matching circuit comprises, in the present example, two separate matching circuits. It is however also conceivable that one configurable matching circuit is provided and that additional components, like capacitors and/or indicates are either activated or deactivated based on the detected type of the ballast.

A power rectifier 27 is provided which is, in the present example, depicted as an LED driver 27. The power rectifier 27 has an input which is connected to the configurable matching circuit and has an output which is connected to the LED array 28. The power rectifier 27 is arranged to convert the AC supply voltage to a DC voltage, and to provide the DC voltage to the LED array 28.

Further, a ballast determining unit is provided which is referenced to with reference numerals 29, 30, 31, 32 and 33. The ballast determining unit 29, 30, 31, 32, 33 comprises a load adaptor 29, a current monitor 31, a voltage monitor 33 and a network selector 32.

The ballast determining unit is arranged for identifying a type of ballast 22 connected to the retrofit LED tube by
  controlling an output voltage of said power rectifier to a first voltage and measuring a first current provided by said power rectifier;
  controlling said output voltage of said power rectifier to a second voltage and measuring a second current provided by said power rectifier, wherein said second voltage differs from said first voltage;
  determining said type of ballast based on said first and second output voltages and said measured first and second currents;
  wherein said ballast determining unit 29, 30, 31, 32, 33 is further arranged to configure said configurable matching circuit 24, 25 based on said determined type of ballast.

It is noted that the current monitor 31 monitors, i.e. measures, the current provided by the power rectifier 27. The current may be measured at multiple reference points in the retrofit LED tube. For example, the current may de measured directly at the output of the power rectifier. In some cases, the current may also be detected at the LED array, i.e. the current that flows through the LED array.

Further, the voltage monitor 33 monitors, i.e. measures, the output voltage of the power rectifier. The measured voltage as well as the measured current provides for a measurement point. The measurement point can be compared with the characteristics as disclosed with respect to FIGS. 1 and 2 to determine which type of ballast is connected to the retrofit LED tube.

In the present situation, the retrofit LED tube comprises a bypass switch 26 arranged to bypass said configurable matching circuit 24, 25 during identification of said type of ballast.

The bypass switch is, for example, a Metal Oxide Semiconductor, MOS, Field Effect Transistor, FET placed in parallel to the configurable matching circuit 24, 25.

This means that no matching circuit is present at the moment of identifying the type of ballast. This is advantageous as in such a situation the type of ballast can be determined more accurately. Once the type of ballast has been determined, the network selector 32 will either select the first matching circuit 24 or the second matching circuit 25. This means that either the first matching circuit 24 or the second matching circuit 25 is connected to the ballast 22.

As an alternative, the configurable matching circuit 24, 25 may be comprised of several components and, depending on the selected type of ballast 22, one or more of these components may be enables to form a matching circuit specifically for the detected type of ballast 22.

As mentioned above, the load adaptor 29 may be arranged to control an output voltage of said power rectifier to a first voltage and measuring a first current provided by said power rectifier. The load adaptor 29 can, for example, amend the load at the output of the power rectifier 27, for example, to a short circuit or to a full load situation.

The block diagram depicted in FIG. 3 may be implemented using a hardware only approach or a hardware/software combination approach. Preferably, a hardware software combination approach is used as this is beneficial for the accuracy of the measurements and as this is beneficial for the size of each of the components.

For example, the network selector 32, the current monitor 31 and/or the voltage monitor 33 may each be any type of hardware such as a microprocessor, a micro controller, a Field Programmable Gate Array, FPGA, or anything alike. The components may be empowered via the AC supply voltage, in combination with the power rectifier, or may be empowered using an auxiliary power supply such as a battery. One microprocessor may be provided which comprises functionality for embodying each of these blocks.

Figure 4:
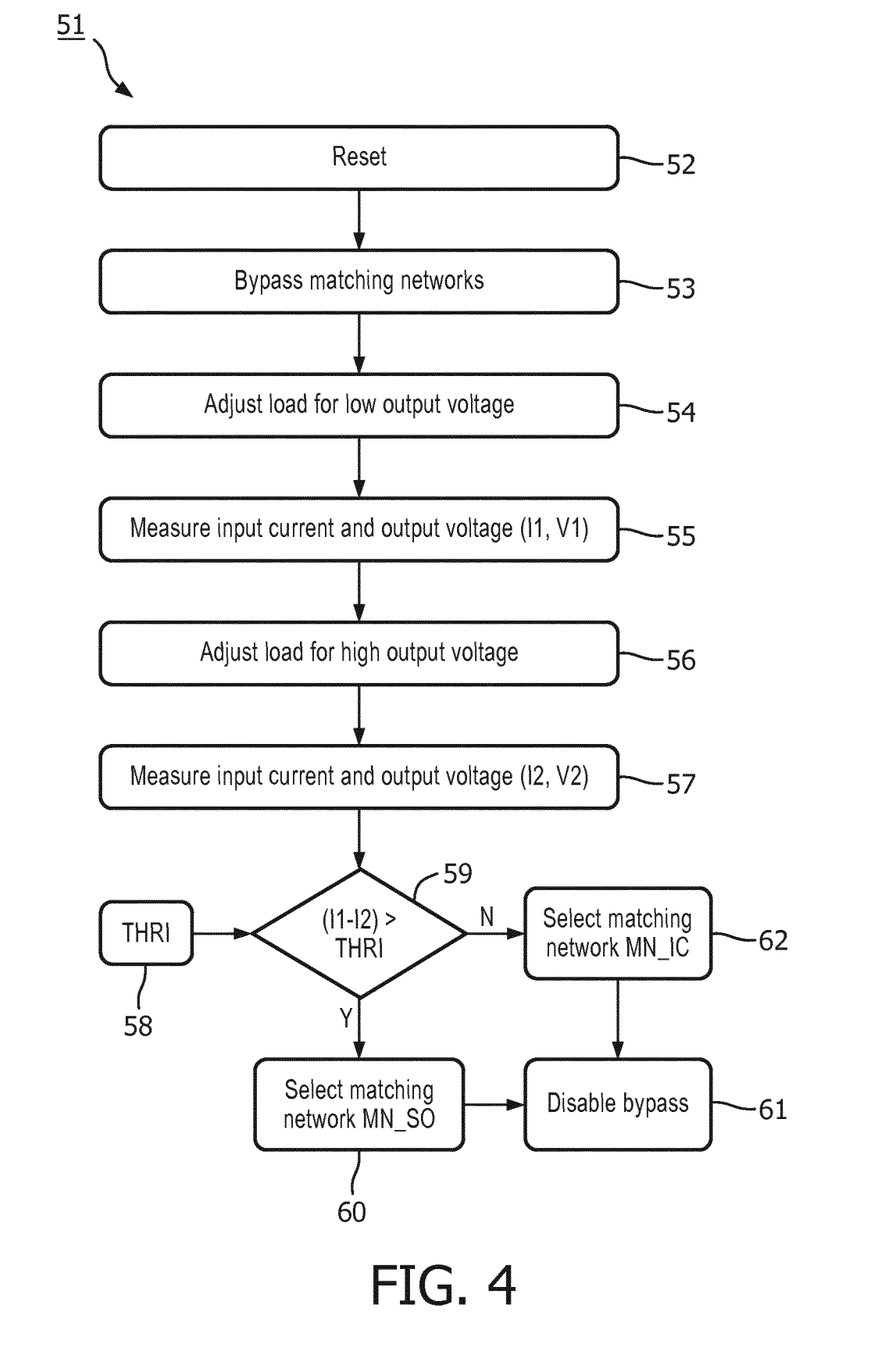
FIG. 4 shows a simplified flow chart of a method according to the present disclosure.

FIG. 4 shows a simplified flow chart 51 of a method according to the present disclosure.

The method is directed to the operating a retrofit LED tube according to any of the embodiments as disclosed above.

In a first step, the retrofit LED tube may be resetted so that the type of ballast is not known. As such, the retrofit LED tube is construed in such a way as if it is just released from the manufacturing factory.

In a next step, the bypass switch is enabled such that both matching circuits are bypassed 53. The determination of the type of ballast is then performed during the bypassing of the matching circuits.

In a subsequent step, the load of the power rectifier is amended such that the power rectifier provides for a low output voltage 54. For example, the output of the power rectifier is short circuited.

In a further step, the current and the voltage are measured 55 to determine the first measurement point related to that specific setting, i.e. to the setting specific for the load that is set.

Then, the load of the power rectifier is again adjusted 56 such that the power rectifier provides for a relative high output voltage. This can be achieved by, for example, turning on the LEDs of the LED array. The current and the output voltage are then again measured 57 to determine the second measurement point related to that specific setting, i.e. to the setting specific for the load that is set.

In this particular situation, the ballast determining unit comprises a predefined current threshold 58.

In case the difference in the current between the first measurement point and the second measurement point is less than the current threshold, then the IC controlled ballast is determined 62. In case the difference in the current between the first measurement point and the second measurement point is larger than the current threshold, then the self-oscillating ballast is determined 60. Finally, the bypass 61 is disabled such that the determined, and selected, matching circuit is enabled.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A retrofit light emitting diode (LED) tube for replacing a fluorescent tube connected to a ballast, said retrofit LED tube comprising:
   an LED array for emitting light;
   a configurable matching circuit for controlling input power from the ballast towards said LED array;
   a power rectifier having an input connected to said matching circuit and an output connected to said LED array, wherein said power rectifier is arranged to receive an AC supply voltage at said input, to convert said AC supply voltage to a DC voltage, and to provide said DC voltage, via said output, to said LED array; and
   a ballast determining unit arranged to:
      control an output voltage of said power rectifier to a first voltage and measure a first current provided by said power rectifier when the first voltage is provided;
      control said output voltage of said power rectifier to a second voltage and measure a second current provided by said power rectifier when the second voltage is provided, wherein said second voltage differs from said first voltage;
      determine a type of ballast connected to said retrofit LED tube based on said first and second output voltages and said measured first and second currents; and
      configure said configurable matching circuit based on said determined type of ballast.

2. A retrofit LED tube according to claim 1, wherein said ballast determining unit is further arranged to bypass said configurable matching circuit during identification of said type of ballast.

3. A retrofit LED tube according to claim 1, wherein said configurable matching circuit comprises:
   a first matching circuit matched to a self-oscillating ballast; and
   a second matching circuit matched to an integrated circuit (IC) controlled ballast;
   wherein said ballast determining unit is further arranged to select one of said first and second matching circuits based on said determined type of ballast.

4. A retrofit LED tube according to claim 1, wherein said ballast determining unit is further arranged to:
   determine that said type of ballast is a self-oscillating ballast in case a difference in current between said measured first and second currents exceeds a predefined current threshold; and
   determine that said type of ballast is an IC controlled ballast in case a difference in current between said measured first and second currents is below said predefined current threshold.

5. A retrofit LED tube according to claim 1, wherein said ballast determining unit is further arranged to control said output voltage of said power rectifier by adapting a load at said output of said power rectifier.

6. A retrofit LED tube according to claim 5, wherein said ballast determining unit is arranged to determine said type of ballast by being arranged to:
   short circuit said output of said power rectifier and measure said third current provided by said power rectifier when said output of said power rectifier is short circuited; and
   enable said LED array such that said LED array emits light and measure said fourth current provided by said power rectifier when said LED array is enabled;
   wherein said ballast determining unit is further arranged to determine said type of ballast based on said measured third and fourth currents.

7. A retrofit LED tube according to claim 1, wherein said ballast determining unit is further arranged to determine said type of ballast by being arranged to:
   control an output voltage of said power rectifier to a third voltage and measure a third current provided by said power rectifier;
   wherein said ballast determining unit is further arranged to determine said type of ballast based on said third output voltage and said measured third current.

8. A lighting system, comprising:
   a retrofit LED tube according to claim 1; and
   a ballast connected to said retrofit LED tube.

9. A method of operating a retrofit light emitting diode (LED) tube connected to a ballast, said method comprising the steps of:
   controlling, using a configurable matching circuit, input power from the ballast towards an LED array for emitting light;
   receiving, at an input to a power rectifier connected to said matching circuit, an AC supply voltage;
   converting said AC supply voltage to a DC voltage;
   providing, via an output of the power rectifier, said DC voltage, to said LED array;
   controlling, by a ballast determining unit, an output voltage of said power rectifier to a first voltage and measuring a first current provided by said power rectifier when the first voltage is provided;
   controlling, by said ballast determining unit, said output voltage of said power rectifier to a second voltage and measuring a second current provided by said power rectifier when the second voltage is provided, wherein said second voltage differs from said first voltage;
   determining, by said ballast determining unit, a type of ballast connected to said retrofit LED tube based on said first and second output voltages and said measured first and second currents; and
   configuring, by said ballast determining unit, said configurable matching circuit based on said determined type of ballast.

10. A method according to claim 9, wherein said method comprises the initial step of bypassing, by said ballast determining unit, said configurable matching circuit.

11. A method according to claim 9, wherein said step of configuring comprises selecting, by said ballast determining unit, one of said two matching circuits based on said determined type of ballast.

12. A method according to claim 9, wherein said step of determining comprises:
   determining, by said ballast determining unit, that said type of ballast is a self-oscillating ballast in case a difference in current between said first and second currents exceeds said predefined current threshold; and
   determining, by said ballast determining unit, that said type of ballast is a IC controlled ballast in case a difference in current between said first and second currents falls below said predefined current threshold.

13. A method according to claim 9, wherein said steps of controlling comprise adapting a load at said output of said power rectifier.

14. A method according to claim 9 further comprises the steps of:
   short circuiting, by said ballast determining unit, said output of said power rectifier and measuring said first current provided by said power rectifier;
   enabling, by said ballast determining unit, said LED array such that said LED array emits light and measuring said second current provided by said power rectifier; and
   determining, by said ballast determining unit, said type of ballast based on said first and second output voltages and said measured first and second currents.

15. A method according to claim 9 further comprises the steps of:
   controlling, by said ballast determining unit, an output voltage of said power rectifier to a third voltage and measuring a third current provided by said power rectifier; and
   determining, by said ballast determining unit, said type of ballast based on said first and second and third output voltages and said measured first and second and third currents.

* * * * *